(12) United States Patent
Agravante et al.

(10) Patent No.: US 11,410,023 B2
(45) Date of Patent: Aug. 9, 2022

(54) LEXICOGRAPHIC DEEP REINFORCEMENT LEARNING USING STATE CONSTRAINTS AND CONDITIONAL POLICIES

(71) Applicant: INTERNATIONAL BUSINESS MACHINES CORPORATION, Armonk, NY (US)

(72) Inventors: Don Joven R. Agravante, Tokyo (JP); Asim Munawar, Ichikawa (JP); Ryuki Tachibana, Tokyo (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 684 days.

(21) Appl. No.: 16/290,413

(22) Filed: Mar. 1, 2019

(65) Prior Publication Data

US 2020/0279152 A1    Sep. 3, 2020

(51) Int. Cl.
*G06N 3/04* (2006.01)
*G06N 3/08* (2006.01)

(52) U.S. Cl.
CPC ........... *G06N 3/0481* (2013.01); *G06N 3/082* (2013.01)

(58) Field of Classification Search
CPC .............................. G06N 3/0481; G06N 3/082
USPC .......................................................... 706/15
See application file for complete search history.

(56) References Cited

U.S. PATENT DOCUMENTS

| 6,532,454 | B1* | 3/2003 | Werbos | G06N 20/00 |
| | | | | 706/14 |
| 10,242,665 | B1* | 3/2019 | Abeloe | G05D 1/0221 |
| 10,467,274 | B1* | 11/2019 | Ren | G06V 30/194 |
| 2012/0240185 | A1* | 9/2012 | Kapoor | H04L 63/20 |
| | | | | 726/1 |
| 2017/0024643 | A1 | 1/2017 | Lillicrap et al. | |

(Continued)

FOREIGN PATENT DOCUMENTS

| CN | 108288094 | 7/2018 |
| DE | 202017105598 | 7/2018 |

OTHER PUBLICATIONS

Daniel et al., "Hierarchical Relative Entropy Policy Search", Journal of Machine Learning Research 17 (2016) 1-50 [hereafter Daniel] (Year: 2016).*

(Continued)

*Primary Examiner* — Omar F Fernandez Rivas
*Assistant Examiner* — Shamcy Alghazzy
(74) *Attorney, Agent, or Firm* — Tutunjian & Bitetto, P.C.; Randall Bluestone (57) ABSTRACT

A computer-implemented method is provided for modified Lexicographic Reinforcement Learning. The computer implemented method includes obtaining, by a hardware processor, a sequence of tasks. Each of the tasks corresponds to, and has a one-to-one correspondence with, a respective award from among set of rewards. The method further includes performing, by the hardware processor for each of the tasks, reinforcement learning and deep learning for both of (i) one or more policies and (ii) one or more value functions, with a plurality of sets of samples. A plurality of solutions in a form of the one or more policies and the one or more value functions are parametrized by a single neural network with a selector which selects an input of the single neural network from among the plurality of sets of samples.

20 Claims, 9 Drawing Sheets

(56) References Cited

U.S. PATENT DOCUMENTS

2019/0228495 A1* 7/2019 Tremblay ................. B25J 9/161
2020/0034706 A1* 1/2020 Pham ................... G06N 3/0454

OTHER PUBLICATIONS

Achiam et al., "Constrained Policy Optimization", arXiv:1705.10528v1 [cs.LG] May 30, 2017, 18 pages.

Barto et al., "Recent Advances in Hierarchical Reinforcement Learning", Discrete Event Dynamic Systems: Theory Applications, 13, 41-77, Nov. 18, 2002, pp. 41-77.

Bengio et al., "Curriculum Learning", Proceedings of the 26th International Conference on Machine Learning, Jun. 2009, 9 pages.

Duan et al., "Benchmarking Deep Reinforcement Learning for Continuous Control", Proceedings of the 33rd International Conference on Machine Learning, Jun. 2016, 10 pages.

Gabor et al., "Multi-criteria Reinforcement Learning", ResearchGate, Jan. 1998, 9 pages.

Roijers et al., "A Survey of Multi-Objective Sequential Decision-Making", Journal of Artificial Intelligence Research 48 (2013) 67-113, Oct. 2013, pp. 67-113.

Wray et al., "Multi-Objective MDPs with Conditional Lexicographic Reward Preferences", Proceedings of the 29th AAAI Conference on Artificial Intelligence, Jan. 2015, pp. 3418-3424.

* cited by examiner

LEXICOGRAPHIC DEEP REINFORCEMENT LEARNING USING STATE CONSTRAINTS AND CONDITIONAL POLICIES

BACKGROUND

Technical Field

The present invention generally relates to machine learning, and more particularly to lexicographic deep reinforcement learning using state constraints and conditional policies.

Description of the Related Art

Reinforcement learning (RL) is a powerful class of algorithms that can learn the optimal actions to take in complex environments. However, RL algorithms require a single scalar reward value, which is not the case in many real-world applications.

Lexicographic RL is a multi-objective RL method that gives priorities to rewards. This prioritization also makes it a good candidate for Hierarchical RL but this connection is unexplored. Hence, there is a need for an approach for lexicographic deep reinforcement learning.

SUMMARY

According to an aspect of the present invention, a computer-implemented method is provided for modified Lexicographic Reinforcement Learning. The computer implemented method includes obtaining, by a hardware processor, a sequence of tasks. Each of the tasks corresponds to, and has a one-to-one correspondence with, a respective award from among set of rewards. The method further includes performing, by the hardware processor for each of the tasks, reinforcement learning and deep learning for both of (i) one or more policies and (ii) one or more value functions, with a plurality of sets of samples. A plurality of solutions in a form of the one or more policies and the one or more value functions are parametrized by a single neural network with a selector which selects an input of the single neural network from among the plurality of sets of samples.

According to another aspect of the present invention, a computer program product is provided for modified Lexicographic Reinforcement Learning. The computer program product includes a non-transitory computer readable storage medium having program instructions embodied therewith. The program instructions are executable by a computer to cause the computer to perform a method. The method includes obtaining, by a hardware processor, a sequence of tasks. Each of the tasks corresponds to, and has a one-to-one correspondence with, a respective award from among set of rewards. The method further includes performing, by the hardware processor for each of the tasks, reinforcement learning and deep learning for both of (i) one or more policies and (ii) one or more value functions, with a plurality of sets of samples. A plurality of solutions in a form of the one or more policies and the one or more value functions are parametrized by a single neural network with a selector which selects an input of the single neural network from among the plurality of sets of samples.

According to yet another aspect of the present invention, a computer processing system is provided for modified Lexicographic Reinforcement Learning. The computer processing system includes a memory for storing program code. The computer processor system further includes a hardware processor for running the program code to obtain a sequence of tasks. Each of the tasks corresponds to, and has a one-to-one correspondence with, a respective award from among set of rewards. The processor further runs the program code to perform, for each of the tasks, reinforcement learning and deep learning for both of (i) one or more policies and (ii) one or more value functions, with a plurality of sets of samples. A plurality of solutions in a form of the one or more policies and the one or more value functions are parametrized by a single neural network with a selector which selects an input of the single neural network from among the plurality of sets of samples.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to lexicographic deep reinforcement learning using state constraints and conditional policies.

Hence, one or more embodiments of the present invention enables the use of a lexicographic RL method with deep RL (especially policy gradient methods).

Thus, in an embodiment, the present invention is ideal for learning complex tasks with multiple rewards in continuous spaces. Moreover, in an embodiment, the present invention can also provide unique solutions depending on the given reward prioritization. This can potentially be applied to problems requiring customization/personalization of learned policies. These and other applications to which the present invention can be applied are readily determined by one of ordinary skill in the art given the teachings of the present invention provided herein, while maintaining the spirit of the present invention.

Figure 1:
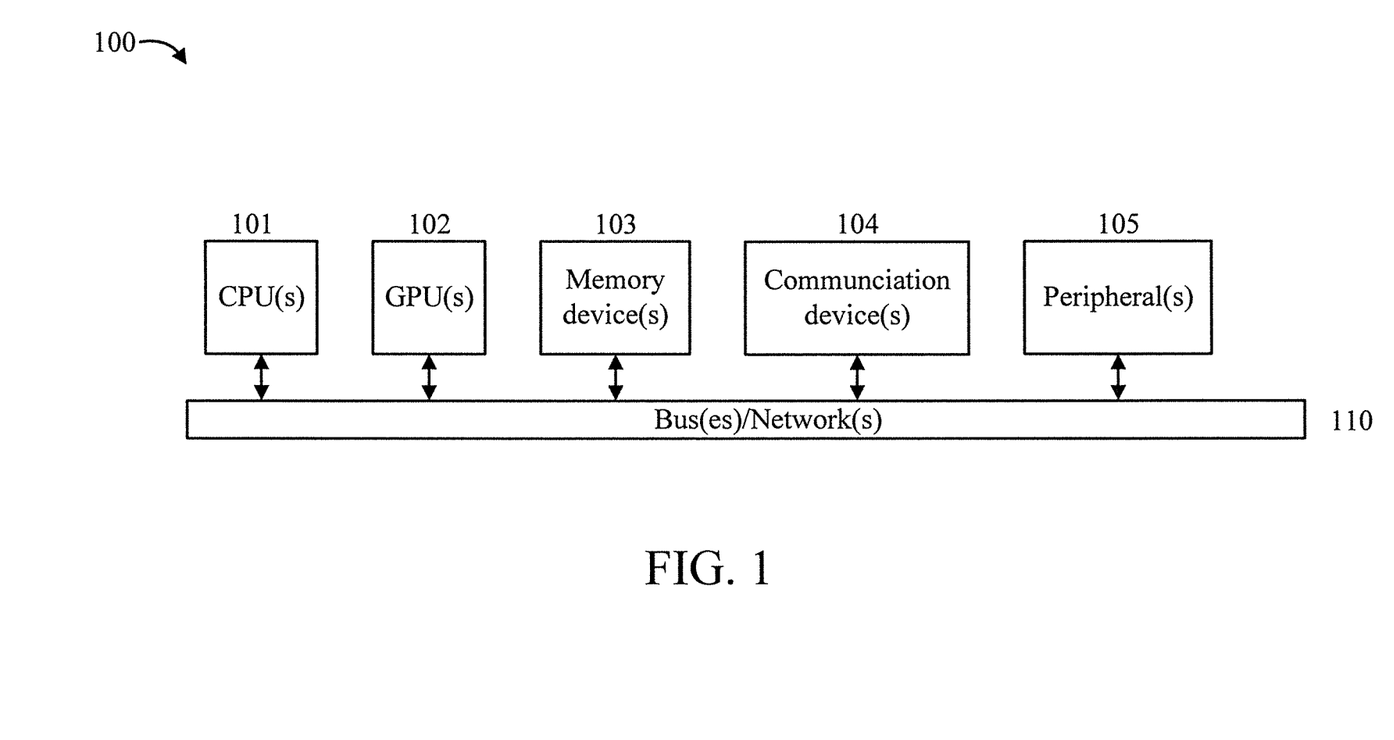
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules in order to transform the computer processor system in a special purpose computer configured to implement various aspects of the present invention. In an embodiment, special purpose hardware (e.g., Application Specific Integrated Circuits, and so forth) can be used to implement various aspects of the present invention.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, in another embodiment, a cloud configuration can be used (e.g., see FIGS. 8-9). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

An overview will now be given of various aspect of the present invention, in accordance with various embodiments of the present invention.

In an embodiment, a conditional policy formulation is provided so multiple policies are parametrized by a single neural network. This includes: (a) adding a selector as an additional input; (b) adding a loss function for action diversity; and (c) combining the value functions. Moreover, the conditional policy formulation encourages finding many different solutions in a single RL run (instead of learning multiple policies by re-running RL separately). The shared portion of the policy can be learned at the same time so it is more sample efficient. The value functions are combined to provide better coverage of the solution space, which is important since it constrains learning the next task.

In an embodiment, action constraints are reformulated as constraints on the next state. This allows the use of existing policy-gradient methods which usually do not have the action-value function (only the value function instead).

The state constraints are useful but difficult to impose normally. Instead, in an embodiment, the present invention re-formulates the state constraints as an early-reset condition and then provides negative reinforcement when the early-reset condition is triggered. The early-reset condition is like a constraint, since the early-reset pushes the solution away from the constraint boundaries and does not explore beyond the constraint boundaries. The early-reset condition also has a potential benefit of being more sample efficient since better solution candidates have a higher chance to be explored. The previous optimal policy is used to provide a "look-ahead" to the next optimal state. A policy is called optimal if it achieves the best expected return from any initial state.

Figure 2:
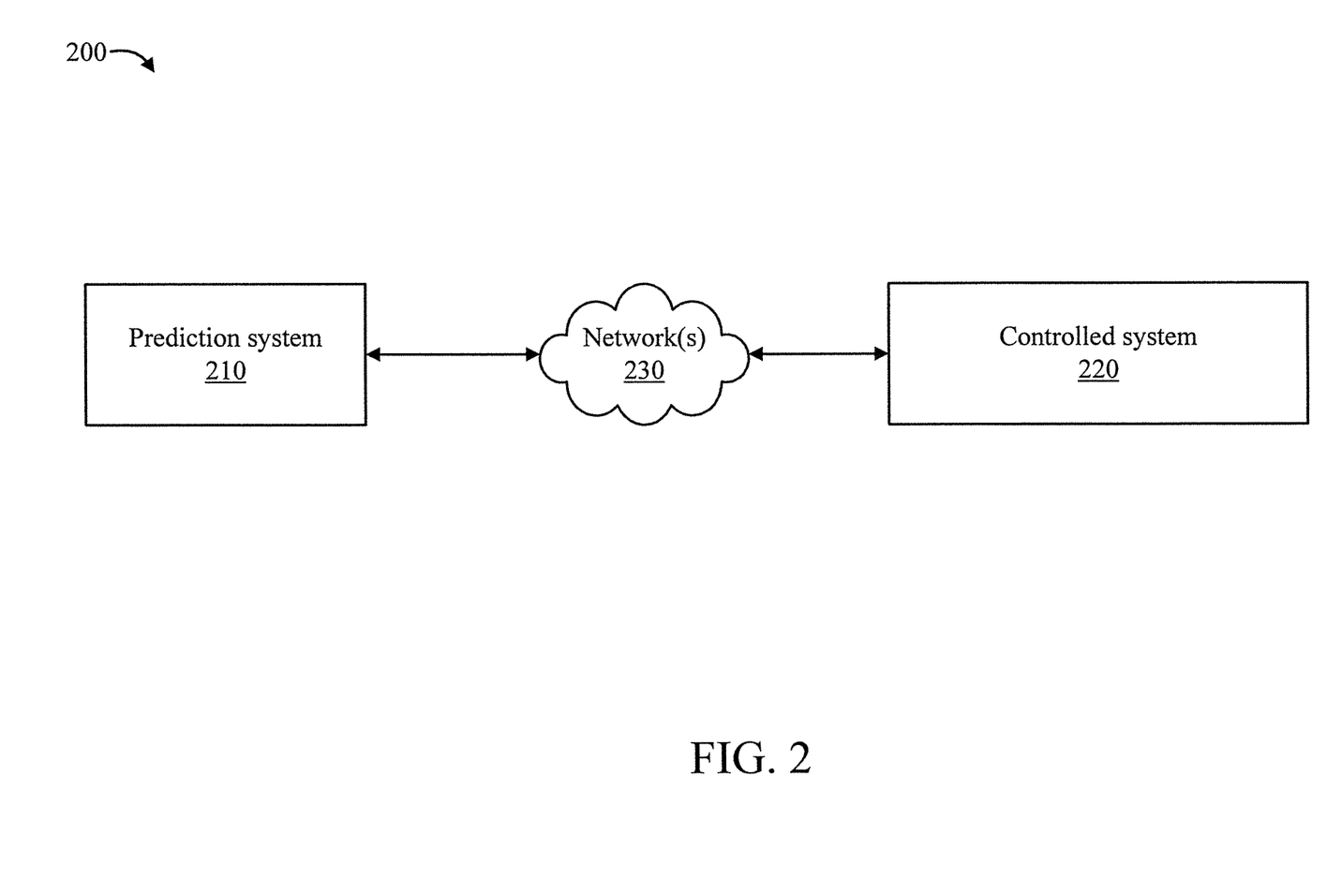
FIG. 2 is a block diagram showing an exemplary environment to which the present invention can be applied, in accordance with an embodiment of the present invention.

FIG. 2 is a block diagram showing an exemplary environment 200 to which the present invention can be applied, in accordance with an embodiment of the present invention.

The environment 200 includes a RL system 210 and a controlled system 220. The RL system 210 and the controlled system 220 are configured to enable communications therebetween. For example, transceivers and/or other types of communication devices including wireless, wired, and combinations thereof can be used. In an embodiment, communication between the RL system 210 and the controlled system 220 can be performed over one or more networks, collectively denoted by the figure reference numeral 230. The communication can include, but is not limited to, a sequence of tasks and/or a set of rewards data and/or predictions. The controlled system 220 can be any type of processor-based system such as, for example, but not limited to, a robotic system or device, a music recommendation system, a factory management system, and so forth. The controlled system 220 can be controlled based on a prediction generated by the RL system 210. Examples of potential applications to which the RL system 210 can be applied that have multiple unrelated rewards include the following:
(1) Robotics: (a) Optimize balance; and (b) Optimize moving to a goal.
(2) Music recommendation system: (a) Minimize user skipping songs; and (b) Maximize "song variety".
(3) Factory management: (a) Keep production quality above a certain level; (b) Minimize energy costs; and (c) Maximize worker happiness. It is to be appreciated that the preceding actions are merely illustrative and, thus, other actions can also be performed depending upon the implementation, as readily appreciated by one of ordinary skill in the art given the teachings of the present invention provided herein, while maintaining the spirit of the present invention.

In an embodiment, the RL system 210 can be implemented as a node in a cloud-computing arrangement. In an embodiment, a single RL system 210 can be assigned to a single controlled system or to multiple controlled systems e.g., different robots in an assembly line, and so forth). These and other configurations of the elements of environment 200 are readily determined by one of ordinary skill in the art given the teachings of the present invention provided herein, while maintaining the spirit of the present invention.

Figure 3:
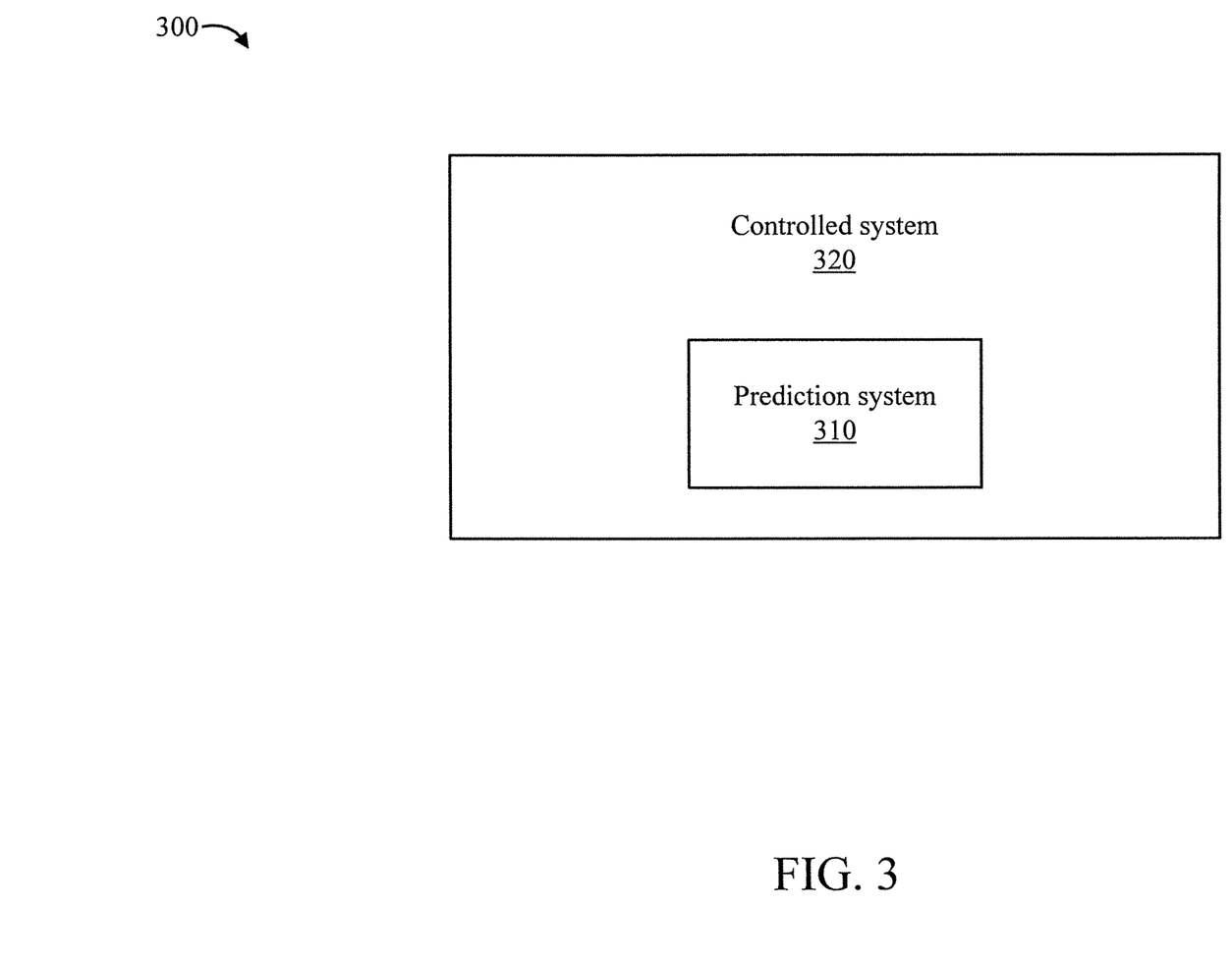
FIG. 3 is a block diagram showing another exemplary environment to which the present invention can be applied, in accordance with an embodiment of the present invention.

FIG. 3 is a block diagram showing another exemplary environment 300 to which the present invention can be applied, in accordance with an embodiment of the present invention.

The environment 300 includes a controlled system 320 that, in turn, includes a RL system 310. One or more communication buses and/or other devices can be used to facilitate inter-system, as well as intra-system, communication. The controlled system 320 can be any type of processor-based system such as, for example, but not limited to, a robotics system/device, a music recommendation system, a factory management system, and so forth.

Other than system 310 being included in system 320, operations of these elements in environments 200 and 300 are similar. Accordingly, elements 310 and 320 are not described in further detail relative to FIG. 3 for the sake of brevity, with the reader respectively directed to the descriptions of elements 210 and 220 relative to environment 200 of FIG. 2 given the common functions of these elements in the two environments 200 and 300.

Figure 4:
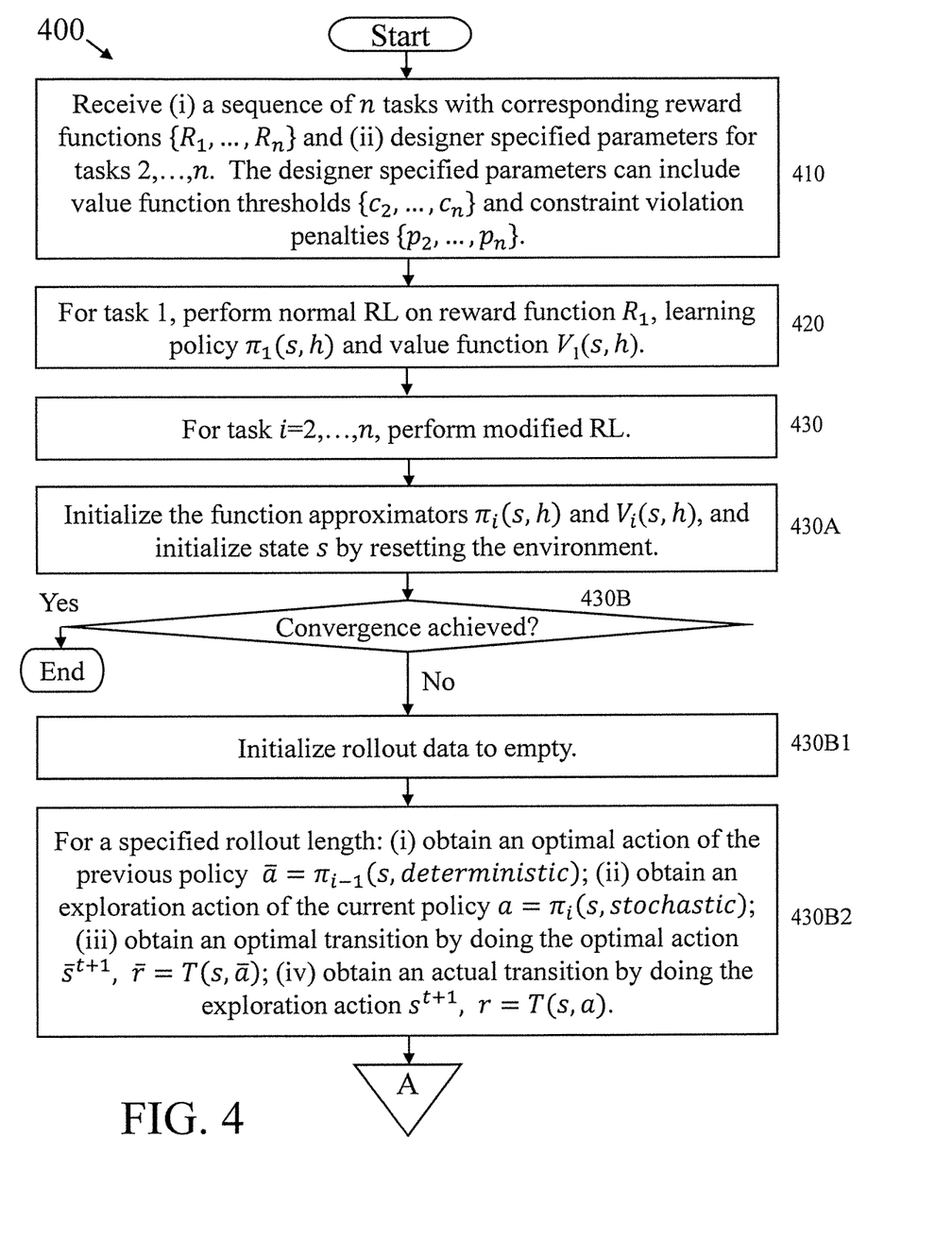
FIGS. 4-5 are flow diagrams showing an exemplary method for modified lexicographic Reinforcement Learning (RL), in accordance with an embodiment of the present invention.
Figure 5:
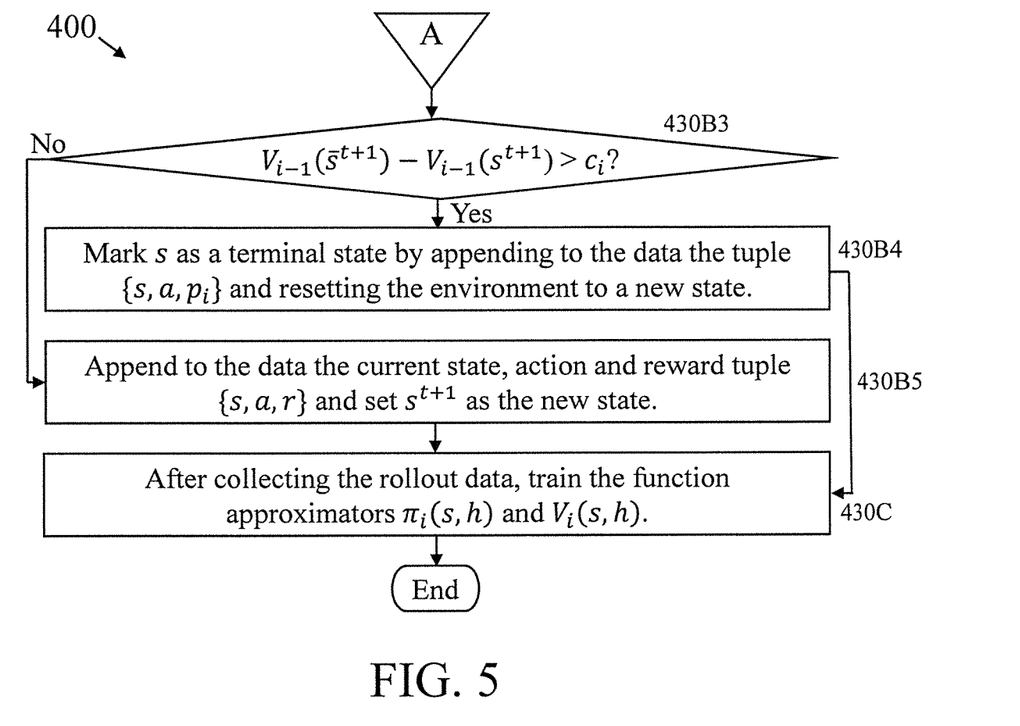

FIGS. 4-5 are flow diagrams showing an exemplary method 400 for modified lexicographic Reinforcement Learning (RL), in accordance with an embodiment of the present invention.

At block 410, receive (i) a sequence of n tasks with corresponding reward functions $\{R_1, \ldots, R_n\}$ and (ii) designer specified parameters for tasks 2, . . . , n. The designer specified parameters can include value function thresholds $\{c_2, \ldots, c_n\}$ and constraint violation penalties $\{p_2, \ldots, p_n\}$. In an embodiment, there is a one-to-one correspondence between each of the n tasks and a respective one of the corresponding reward functions $\{R_1, \ldots, R_n\}$.

At block 420, for task 1, perform normal RL on reward function $R_1$, learning policy value function $V_1(s)$, and the selector h.

At block 430, for task i=2, . . . , n, perform modified RL.

In an embodiment, block 430 can include one or more of blocks 430A and 430B.

At block 430A, initialize the function approximators $\pi_i$, $V_i(s)$, h and initialize state s by resetting the environment.

At block 430B, determine if convergence has been achieved. If so, then terminate the method. Otherwise, proceed to block 430B1.

At block 430B1, initialize rollout data to empty.

At block 430B2, for a specified rollout length: (i) obtain an optimal action of the previous policy $\bar{a}=\pi_{i-1}(s,$ deterministic); (ii) obtain an exploration action of the current policy $a=\pi_i(s,$ stochastic); (iii) obtain an optimal transition by doing the optimal action $\bar{s}^{t+1}$, $\bar{r}=T(s, a)$; (iv) obtain an actual transition by doing the exploration action $s^{t+1}$, $r=T(s, a)$.

At block 430B3, further for a specified rollout length, evaluate the constraint proxy as follows: $V_{i-1}(\bar{s}^{t+1})-V_{i-1}(s^{t+1})>c_1$. If so, then proceed to block 430B4. Otherwise, proceed to block 430B5.

At block 430B4, mark s as a terminal state by appending to the data the tuple $\{s, a, p_1\}$ and resetting the environment to a new state.

At block 430B5, append to the data the current state, action and reward tuple $\{s, a, r\}$ and set $s^{t+1}$ as the new state.

At block 430C, after collecting the rollout data, train the function approximators $\pi_i$ (s, h) and $V_i(s, h)$.

A further description will now be given regarding various aspects of method 300, in accordance with various embodiments of the present invention.

In an embodiment, for each stage requiring a multi-modal policy, a "selector" input h is added to the policy and value function. In an embodiment, an inter-policy entropy loss is also added to encourage policies to be different. For the next task, the combined value function is used which is $$V^*(s) = \max_h V(s, h),$$

which assumes that the best policy is always followed.

Optionally, we can also use Transfer Learning by initializing the current policy network with the previous policy.

The value function thresholds $\{c_2, \ldots, c_n\}$ are parameters for the designer The constraint violation penalties $\{p_2, \ldots, p_n\}$ should be small, so there is no effect on learning the reward functions: $\{R_1, \ldots, R_n\}$.

Figure 6:
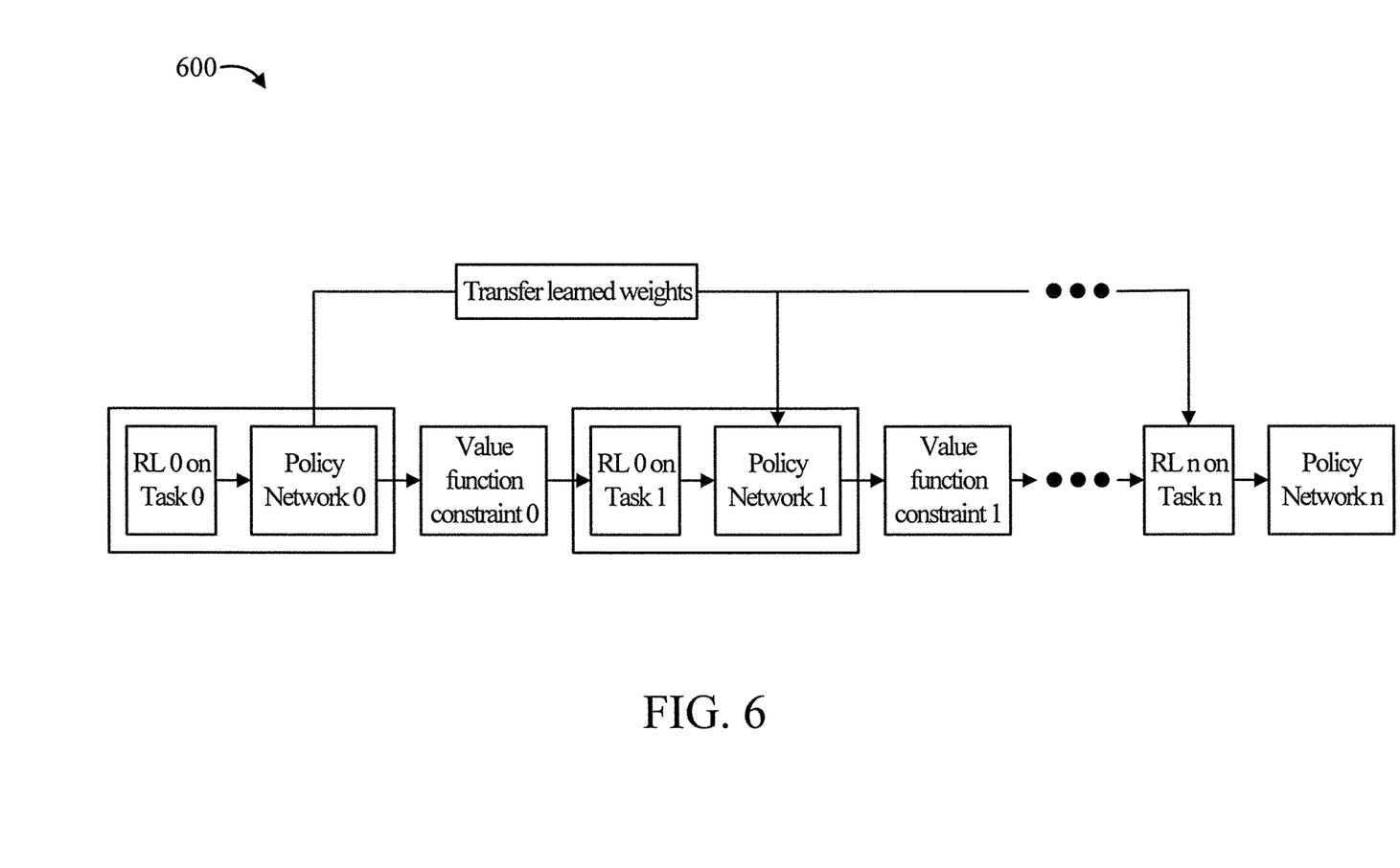
FIG. 6 is a block diagram showing an exemplary sequence of Reinforcement Learning (RL), in accordance with an embodiment of the present invention.

FIG. 6 is a block diagram showing an exemplary sequence of Reinforcement Learning (RL) 600, in accordance with an embodiment of the present invention.

The sequence of RL 600 involves RL 1 through RL n, policy network 0 through policy network n, value function constraint 0 through value function constraint n (not shown), and transferred learned weights.

A sequence of tasks (task 0 through task n) are defined from corresponding rewards.

At each RL, learn policy weights and a value function. To that end, use the previous value function to define state constraints for the next RL run. Moreover, transfer the learned weights from a previous policy networks to subsequent policy networks, from among policy network 0 through policy network n.

The preceding described embodiment is an approximation of the following state constraint:

$$s_i^{t+1} \in S_i | \max V_{i-1}(s_i^{t+1}) - V_{i-C1}(s_i^{t+1}) \le c_{i+1}$$

where s denotes state, subscript I denotes the task number, superscripts t denotes the time step during execution of RL, S denotes the space of all states, V denotes the vale function, and c denotes the value function threshold parameter.

Figure 7:
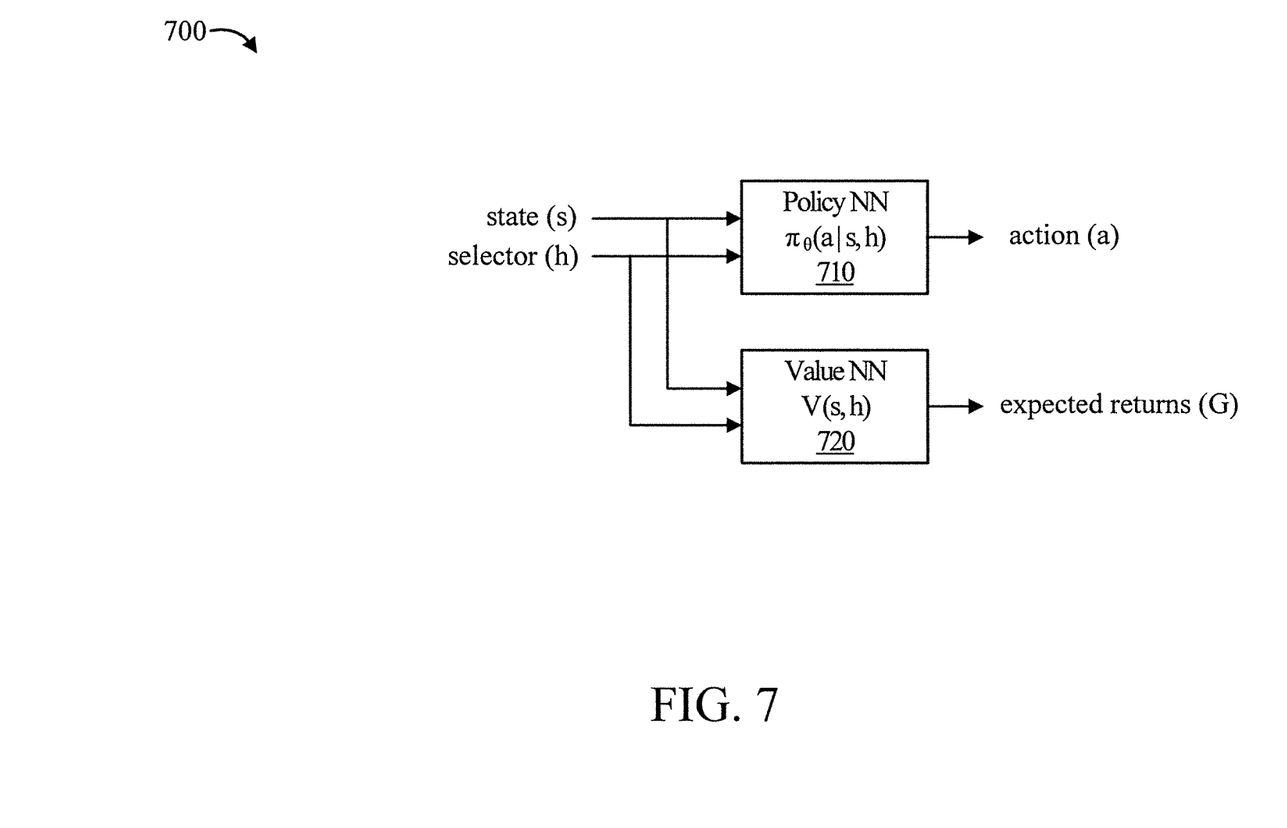
FIG. 7 is a block diagram showing an exemplary conditional policy formulation, in accordance with an embodiment of the present invention.

FIG. 7 is a block diagram showing an exemplary conditional policy formulation 700, in accordance with an embodiment of the present invention.

The conditional policy formulation 700 involves a policy Neural Network (NN) 710 and a value NN 720. The policy NN 710 involves $\pi_\theta(a|s, h)$, where $\pi_\theta$ denotes a particular policy, a denotes a particular action, s denotes a particular state, and h denotes a selector input. The policy NN 710 and the value NN 720 receive state s and selector h signals as inputs. The policy NN 710 outputs an action given the state s and selector h inputs. The value NN 720 outputs expected returns G given the state and selector inputs.

Policy updates are performed using the following equation:

$$\theta \leftarrow \theta + \alpha \{\nabla_\theta J(\pi_\theta) + \beta \nabla_\theta \mathcal{L}(a|h)\},$$

where $\alpha\{\nabla j(\pi_0)\}$ denotes a policy gradient, and $\beta \nabla_\theta \mathcal{L}(a|h)\}$ denotes a gradient of the "action diversity"/entropy loss.

Moreover, the following "universal value function approximator" is used:

$$V(s) = \max_h V(s, h)$$

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
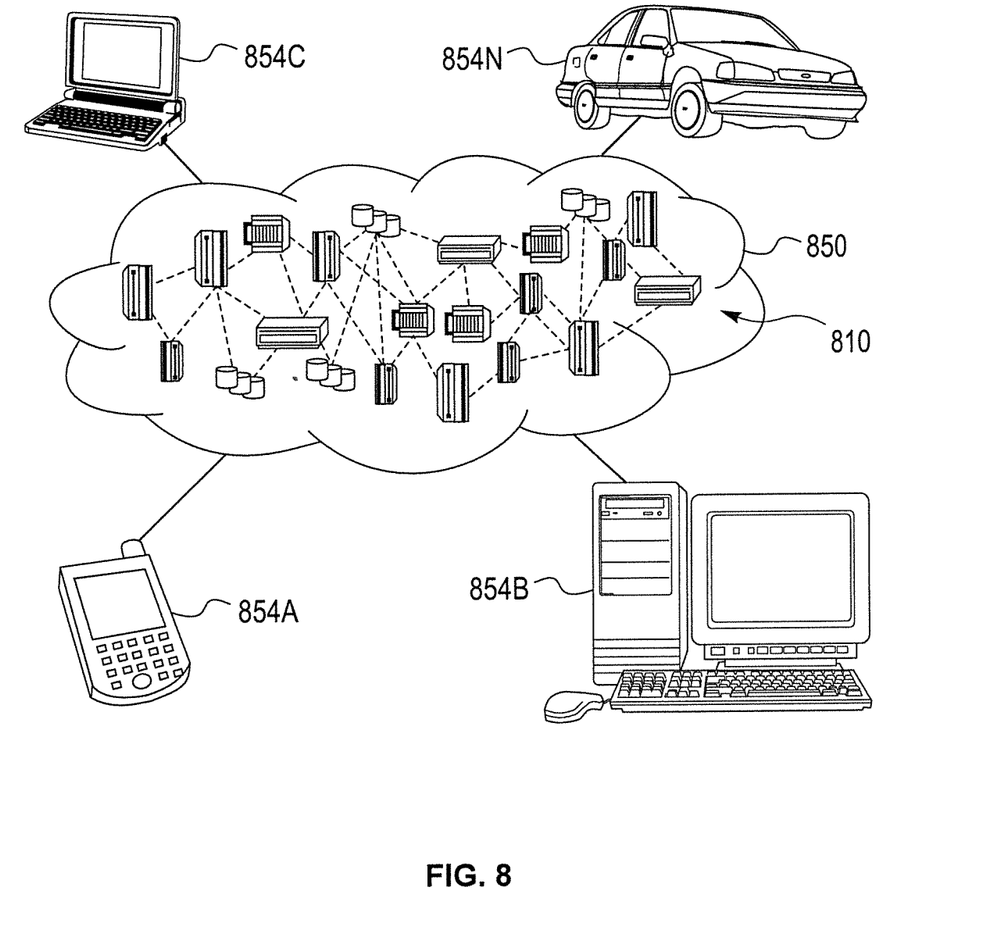
FIG. 8 is a block diagram showing an illustrative cloud computing environment having one or more cloud computing nodes with which local computing devices used by cloud consumers communicate, in accordance with an embodiment of the present invention.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
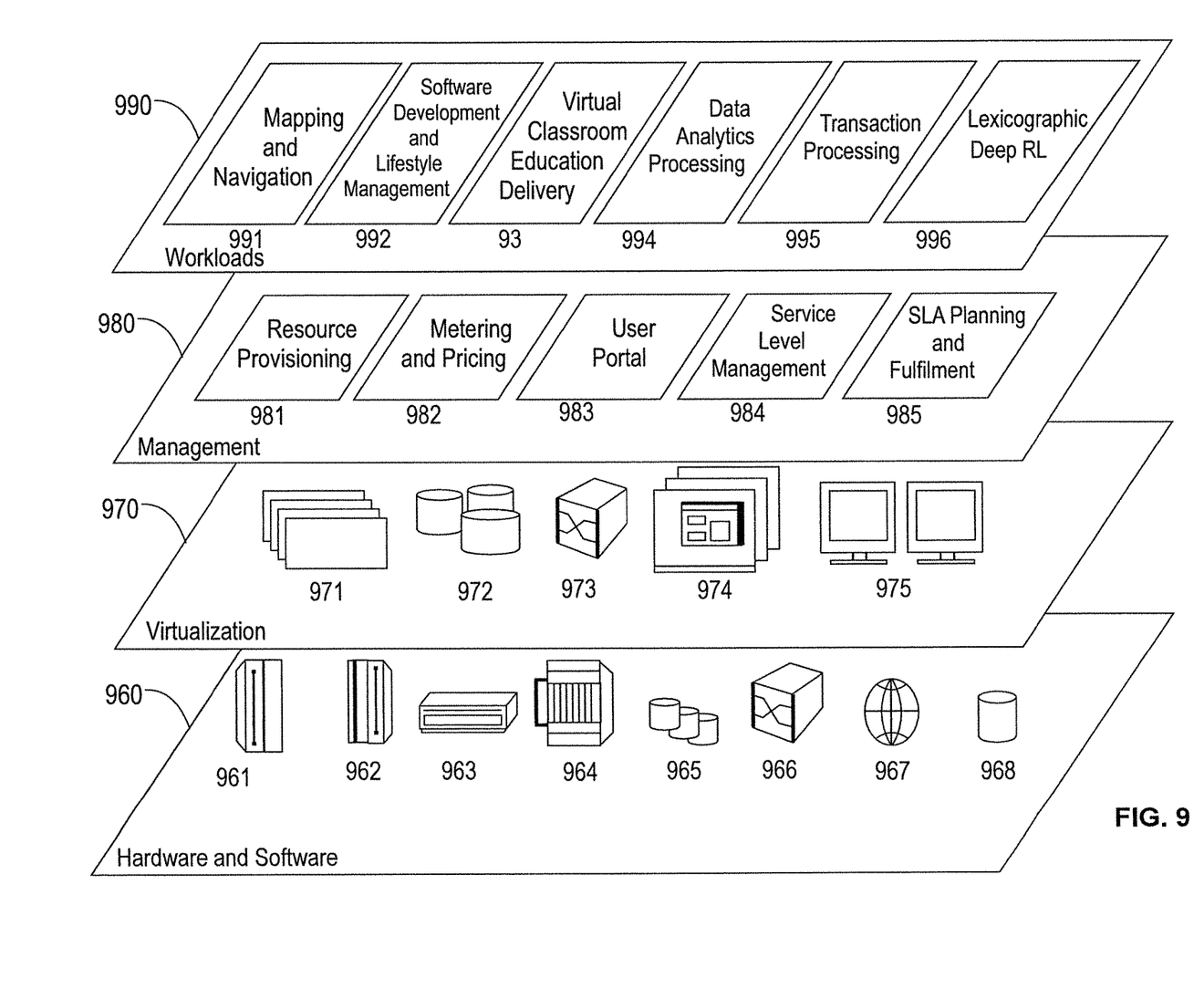
FIG. 9 is a block diagram showing a set of functional abstraction layers provided by a cloud computing environment, in accordance with an embodiment of the present invention.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and Lexicographic deep RL using approximate state constraints and conditional policies 996.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for modified Lexicographic Reinforcement Learning, comprising:

obtaining, by a hardware processor of a robotic system, a sequence of tasks, each of the tasks corresponding to, and having a one-to-one correspondence with, a respective award from among set of rewards;

performing, by the hardware processor for each of the tasks, machine-based reinforcement learning and machine-based deep learning for both of (i) two or more policies and (ii) two one or more value functions, with a plurality of sets of samples, wherein a plurality of solutions in a form of the two or more policies and the two or more value functions are parametrized by a single neural network with a selector which selects an input of the single neural network from among the plurality of sets of samples; and controlling a movement of the robotic system responsive to an output of the single neural network.

2. The computer-implemented method of claim 1, wherein at least one of the two or more value functions is used as a state constraint to a next task from among the sequence of tasks.

3. The computer-implemented method of claim 2, wherein the deep learning comprises updating a policy, from among the two or more policies, according to a policy gradient and a loss function that maximizes inter-policy entropy.

4. The computer-implemented method of claim 3, wherein the loss function accounts for action diversity in the plurality of sets of samples.

5. The computer-implemented method of claim 1, wherein each of the plurality of solutions has a one-to-one correspondence with the selector.

6. The computer-implemented method of claim 1, wherein the plurality of solutions are obtained from a single RL iteration.

7. The computer-implemented method of claim 1, further comprising reformulating action constraints into next state constraints.

8. The computer-implemented method of claim 1, further comprising reformulating state constraints into an early reset condition.

9. The computer-implemented method of claim 8, further comprising performing negative reinforcement learning responsive to a triggering of the early reset condition.

10. The computer-implemented method of claim 1, wherein the early reset condition is configured to push the plurality of solutions away from constraint boundaries and prevent exploration beyond the constraint boundaries.

11. The computer-implemented method of claim 1, wherein the early reset condition is configured to provide a look ahead mechanism to a next optimal state.

12. The computer-implemented method of claim 1, wherein the ene two or more value functions comprise a plurality of value functions, and wherein the method further comprises combining at least two of the plurality of value functions at a given reinforcement learning iteration to expand coverage of a solution space from which the plurality of solutions are derived.

13. A computer program product for modified Lexicographic Reinforcement Learning, the computer program product comprising a non-transitory computer readable storage medium having program instructions embodied therewith, the program instructions executable by a computer of a robotic system to cause the computer to perform a method comprising:

obtaining, by a hardware processor of the robotic system, a sequence of tasks, each of the tasks corresponding to, and having a one-to-one correspondence with, a respective award from among set of rewards;

performing, by the hardware processor for each of the tasks, machine-based reinforcement learning and machine-based deep learning for both of (i) two or more policies and (ii) two or more value functions, with a plurality of sets of samples, wherein a plurality of solutions in a form of the two or more policies and the two or more value functions are parametrized by a single neural network with a selector which selects an input of the single neural network from among the plurality of sets of samples; and controlling a movement of the robotic system responsive to an output of the single neural network.

14. The computer program product of claim 13, wherein at least one of the two or more value functions is used as a state constraint to a next task from among the sequence of tasks.

15. The computer program product of claim 14, wherein the deep learning comprises updating a policy, from among the two or more policies, according to a policy gradient and a loss function that maximizes inter-policy entropy.

16. The computer program product of claim 15, wherein the loss function accounts for action diversity in the plurality of sets of samples.

17. The computer program product of claim 13, wherein each of the plurality of solutions has a one-to-one correspondence with the selector.

18. The computer program product of claim 13, wherein the plurality of solutions are obtained from a single RL iteration.

19. The computer program product of claim 13, wherein the method further comprises reformulating action constraints into next state constraints.

20. A computer processing system of a robotic system for modified Lexicographic Reinforcement Learning, comprising:

a memory of the robotic system for storing program code; and a hardware processor of the robotic system for running the program code to obtain a sequence of tasks, each of the tasks corresponding to, and having a one-to-one correspondence with, a respective award from among set of rewards;

perform, for each of the tasks, machine-based reinforcement learning and machine-based deep learning for both of (i) two or more policies and (ii) two or more value functions, with a plurality of sets of samples, wherein a plurality of solutions in a form of the two or more policies and the two or more value functions are parametrized by a single neural network with a selector which selects an input of the single neural network from among the plurality of sets of samples; and control a movement of the robotic system responsive to an output of the single neural network.

* * * * *